Figure 1:
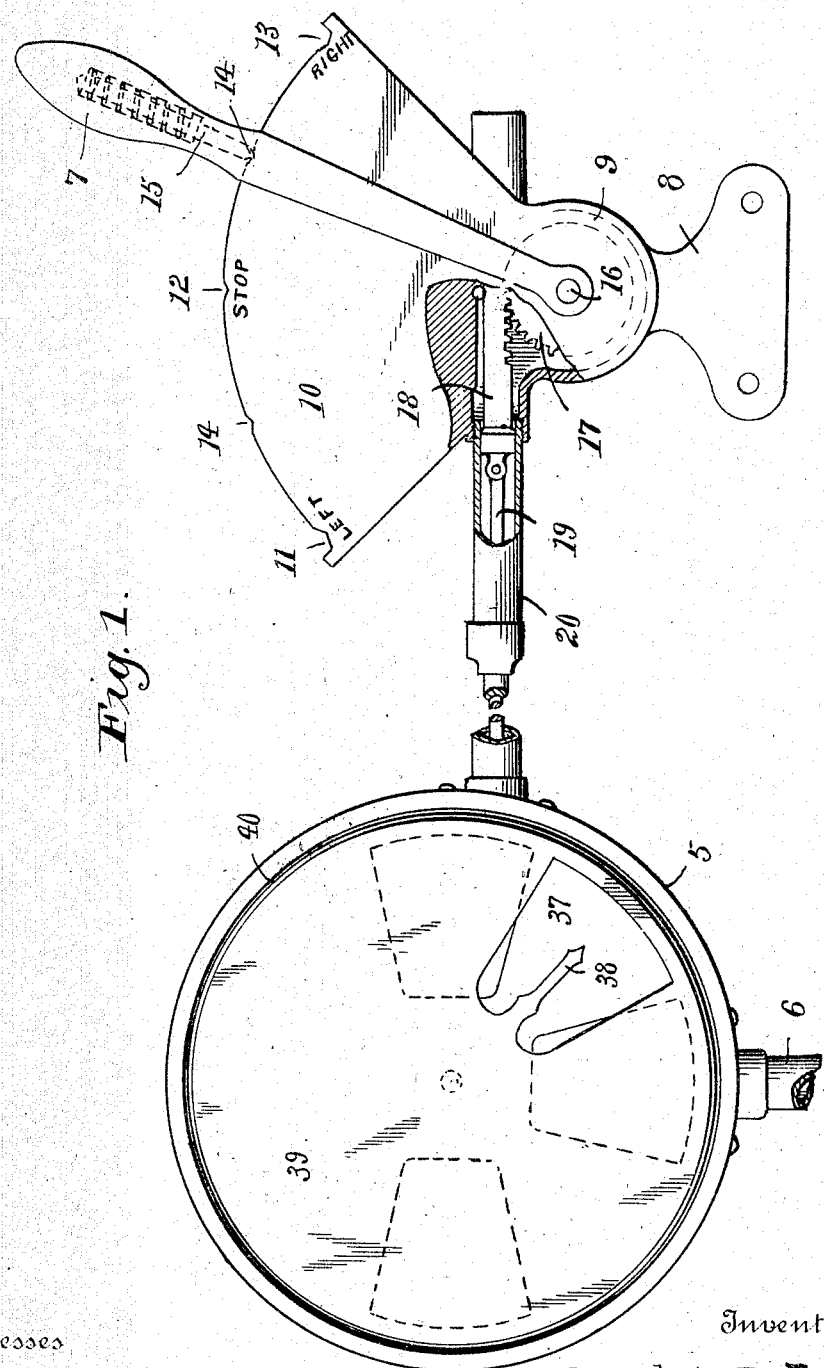

F. R. BODNAR.
AUTOMOBILE SIGNAL.
APPLICATION FILED SEPT. 13, 1915.

1,185,170.

Patented May 30, 1916.
2 SHEETS—SHEET 1.

Witnesses
Ruth M. H. Koger
Elbert T. Hull

Inventor
Frank R Bodnar
By Chamberlain & Newman
Attorneys

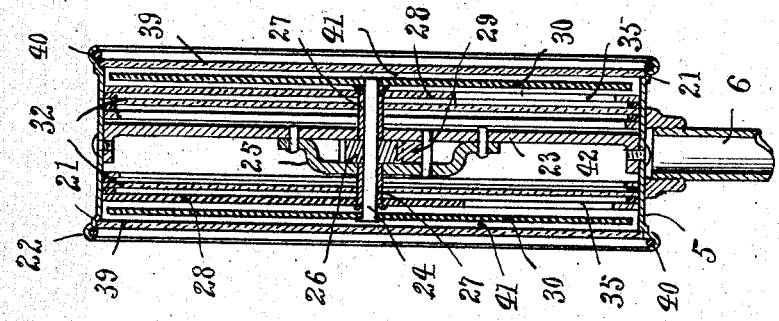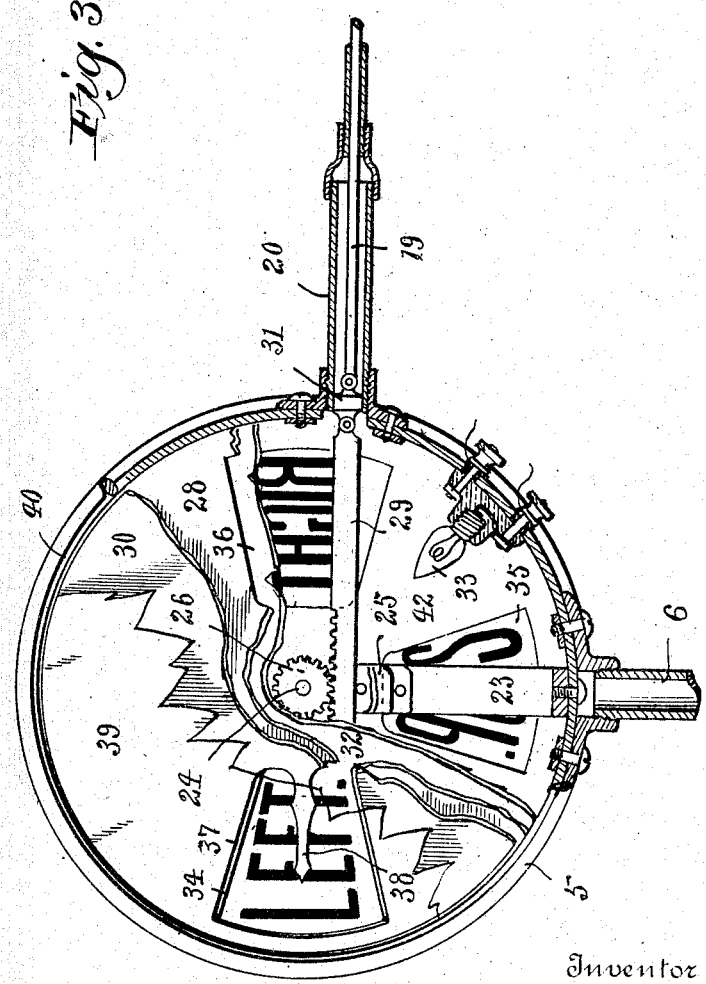

UNITED STATES PATENT OFFICE.

FRANK R. BODNAR, OF BRIDGEPORT, CONNECTICUT.

AUTOMOBILE-SIGNAL.

1,185,170.  Specification of Letters Patent.  Patented May 30, 1916.

Application filed September 13, 1915. Serial No. 50,314.

*To all whom it may concern:*

Be it known that I, FRANK R. BODNAR, a subject of the King of Hungary, citizen of the United States, and resident of Bridgeport, in the county of Fairfield and State of Connecticut, have invented certain new and useful Improvements in Automobile-Signals, of which the following is a specification.

My invention relates to new and useful improvements in signaling devices such as are used upon automobiles, motor vehicles and the like, to indicate to the public what the driver's intentions are as to the future and further movements of the machine.

The primary object of the invention is to provide a signaling device including duplicate signs which may be illuminated from time to time, to make them visible, and particularly to adapt the same to be attached to the side of a car so that the signs may be read both from the front and in the rear of the car, and further to arrange the signaling device in close proximity to the driver's seat so that he may not only have the same convenient for operation, but likewise so that he may see it and know just what signs are displayed; to include a series of signs such as the words "Right"—"Left" and "Stop", so they may be clearly seen from the back of the car and a duplicate set of the same signs which are simultaneously operated and adapted to be read from the front; further to construct the device along substantial mechanical lines whereby it may be manually operated by the driver of the car.

With these and other objects in view the invention resides and consists in the construction and novel combination and arrangement of parts hereinafter more fully described, illustrated in the accompanying drawings, and pointed out in the claims hereto appended, it being understood that various changes in the form, proportion and size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 shows a side elevation of my improved signaling device including both the signal proper and its connected operating mechanism, the connection of the latter with the former being shown broken, to better adapt the drawing to the size of the sheet. Fig. 2 shows a front elevation of the signaling device shown in Fig. 1, the front plates, the inclosing glass, dial and casing being broken away upon the front side to better show the internal construction and mechanism, and Fig. 3 shows a central vertical longitudinal section of Fig. 2.

My invention as shown includes a duplex signaling device having a connected operating lever. By duplicates I mean a signaling device with two faces one for the front and one for the rear, and the two opposite each other and arranged to operate simultaneously so that one of the series of signs in front will show with one of those in the rear or opposite face of the casing. The operating device, as well as the indicator, is shown in Fig. 1, while the indicator proper is more particularly illustrated in Figs. 2 and 3.

Referring in detail to the characters of reference marked upon the drawings 5 represents the casing of the signaling device proper and 6 the post for supporting the same. This post may be of any preferred form and is obviously designed for attachment to a suitable part of an automobile body.

The signs as before stated are manually operated by a hand lever 7 forming a part of an operating device which is adapted to be attached to the dash board of a car body. This operating device more particularly includes a bracket 8 which serves as a support for the housing 9 and dial plate 10 upon the face of which is indicated the words Left,— Right and Stop. These words are equally spaced one from the other, the word Left being located at the left and arranged close to the peripheral notch 11 in the edge of the dial plate, while the word Stop is arranged adjacent to a similar notch 12 in the center of the dial plate and the word Right being adjacent to a notch 13 at the right. Small notches 14—14 are arranged half way between the notches 11 and 12, and 12 and 13 so as to provide an intermediate station for the stoppage of the hand lever whereby no signs would be visible. This hand lever carries a spring actuated detent 15 for engaging these notches so as to hold the controller lever in either of its adjusted positions. The lever is mounted upon a shaft 16 journaled in the housing 9 formed upon the base of the plate and upon this shaft is secured a gear 17 that meshes with a slide rack 18 adapted to be moved backward and forward within the casing, and to which is pivoted a connecting rod 19 inclosed in a pipe 20.

The signaling device proper is preferably cylindrical in form having two faces arranged parallel one to each other. It is also designed to be made of sheet metal and as will be seen includes a cylindrical form of casing the inner faces of the two outer edge portions of which are rolled to form annular shoulders 21 and concaved grooves 22. A suitably shaped supporting frame 23 is secured central within this casing and forms a bearing in its middle portion for the central shaft 24. A bracket 25 is secured to the side of this frame and is shaped to accommodate the pinion 26 mounted between the bracket and the frame before mentioned. Alined tubular bushings 27—27 are mounted in the frame and bracket to accommodate the shaft 24, said bushings having their outer end portions secured within the fixed plates 28 forming one of the inclosing walls of the indicator.

A rack 29 is slidably mounted to move crosswise in the indicator and is placed to mesh with and operate the pinion 26 together with the shaft 24 and disks 30 mounted thereon. This rack is connected by a swivel connection 31 with the link 19 before mentioned that connects with the operating device. The inclosing plates, disks, &c., are duplicates upon the two opposite faces of the indicator and therefore the same reference characters are employed to indicate the duplicate parts. Glass plates 32—32 serve to form the inner walls of the device and between them is mounted the lamp 33 used to illuminate the interior of the casing and the signs. Just outside of these sheets of glass are arranged the before mentioned metal plates 28 each of which is provided with three openings 34, 35 and 36 one upon each side and the third one at the bottom of the center portion. Immediately in the rear and in line with these openings and upon the glasses 32 are located the words Left,—Right and Stop so that when either of the openings 34, 35 and 36 is uncovered it will expose one of the words on each face to view. The disks 30—30 secured on the opposite ends of the shaft 24 are each provided with a single opening 37 and a pointer 38 that extends out into the opening. These disks turn with the shaft and gear as a result of the sliding movement of the rack and serve to cause the opening 37 and pointer to register with one of the three openings in the inclosing plate 28, as for instance as shown in Fig. 2 where the word "Left" is uncovered. Upon the outside of each of these disks is arranged an additional inclosing glass 39—39 that is seated against the shoulders 21 and held in position by an annular ring 40 that is seated in the annular grooves 22 in the casing. It will thus be seen that each of the disks 30 is adapted to be rotated within a pocket 41 formed between the fixed perforated plates 28 and the inclosing glasses 39 and serve to confine the light within the inner chamber 42, except as it is permitted to show through the opening 37 and against the sign that happens to register therewith.

Having thus described my invention what I claim and desire to secure by Letters Patent is:—

1. A signaling device of the class described, the same comprising a casing having a front and rear inclosing glass and including fixed side face plates inside of the inclosing glasses, each plate having a series of openings therethrough, a fixed transparent plate situated inside of each of the face plates and having words printed thereon opposite the openings in the face plate, a shaft rotatably mounted in the casing, disks mounted upon each end of the shaft and arranged to turn in front of the said face plates, each of said disks having an opening therethrough to be brought to register with either of the openings in the face plate to uncover the same, and a lamp within the casing.

2. A signaling device of the class described, the same comprising a cylindrical casing and including oppositely located fixed end plates each plate having a series of openings therethrough, a fixed transparent plate situated inside of each of the end plates and having words printed thereon opposite the openings in the end plates, a shaft rotatably mounted in the casing, disks mounted upon each end of the shaft and arranged to turn in front of the said end plates, each of said disks having an opening therethrough to be brought to register with either of the openings in the end plates to uncover the same, and a fixed transparent plate situated in front of each of the disks to inclose the cylindrical casing.

Signed at Bridgeport in the county of Fairfield and State of Connecticut this seventh day of September, A. D. 1915.

FRANK R. BODNAR.

Witnesses:
OMRAY L. MASSINGER
FRANK PCKAR.